2,773,906

α,α-DIALKYL-Ar-PHENYLBENZYL HYDROPEROXIDES

William S. Emerson, Dayton, Ohio, assignor to Monsanto Chemical Company, St. Louis, Mo., a corporation of Delaware No Drawing. Application May 6, 1953,
Serial No. 353,428

3 Claims. (Cl. 260—610)

The present invention relates to hydroperoxides and more particularly provides a new class of organic hydroperoxides and a process of producing the same.

An object of the invention is to provide new and valuable α,α-dialkyl-ar-phenylbenzyl hydroperoxides. Another object of the invention is to oxidize certain alkylbiphenyls to the corresponding hydroperoxides. Still another object of the invention is to provide, for the synthetic resins and plastics industry, intermediates which can be prepared easily from readily available raw materials and which can be readily converted into phenylphenols and alkenylbiphenyls.

These and other objects hereinafter disclosed are provided by the following invention in which certain alkylbiphenyls are reacted with oxygen or an oxygen-containing gas in the presence of a peroxidic compound as oxidation catalyst or initiator, substantially according to the scheme:

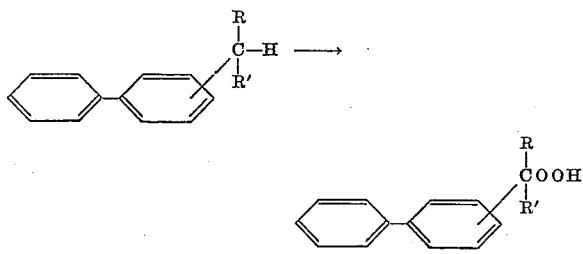

in which R and R′ are alkyl radicals of from 1 to 3 carbon atoms.

As illustrative of alkylbiphenyls having the above formula and useful for the preparation of the present hydroperoxides may be mentioned 2-, 3- or 4-isopropylbiphenyl- 2-, 3- or 4-sec-amylbiphenyl; sec-isoamylbiphenyl; sec-butylbiphenyl; etc. Hydroperoxides provided by the invention include for example, α,α-dimethyl-4-phenylbenzyl hydroperoxide prepared from 4-isopropylbiphenyl α-ethyl-α-methyl-3-phenylbenzyl hydroperoxide prepared from 3-sec-butylbiphenyl; α-n-propyl-α-methyl-4-phenylbenzyl hydroperoxide prepared from 4-sec-amyl-biphenyl; α,α-diethyl-2-phenylbenzyl alcohol obtained from 3-(2′-xenyl)-pentane; α-n-propyl-α-ethyl-4-phenylbenzyl alcohol obtained from 3-(4′-xenyl)hexane; and α,α-di-n-propyl-3-phenylbenzyl hydroperoxide obtained from 4-(3′-xenyl)heptane.

The present α,α-dialkyl-ar-phenylbenzyl hydroperoxides are stable compounds which range from viscous liquids to waxy and crystalline solids depending upon the nature of the alkyl substituent. As shown in the copending application of Erhard J. Prill and Robert A. Heimsch, Serial No. 353,429, filed of even date and now abandoned, they may readily be converted into phenylphenols, which compounds particularly 4-phenylphenol, are of outstanding utility in the formation of alkyd-type synthetic resins.

In effecting the conversion of the alkylbiphenyls to the α,α-dialkyl-ar-phenylbenzyl hydroperoxides, I operate substantially as follows: The alkylbiphenyl is mixed with a small amount, say, from 0.5 percent to 2 percent by weight of an organic hydroperoxide, and an organic or inorganic base in sufficient quantity to render the mixture alkaline; and oxygen or an oxygen-containing gas is passed into the resulting mixture at increased temperatures until formation of the α,α-dialkyl-ar-phenylbenzyl hydroperoxide has taken place. The reaction products generally comprise a solution of the hydroperoxide in the alkylbiphenyl. For many purposes, e. g., for production of phenylphenol, the solution of hydroperoxide may be employed as such. If desired, however, the substantially pure hydroperoxide may be obtained, e. g., by conversion of the hydroperoxide to a salt thereof and extraction of the latter from the organic phase with an inert solvent from which it is then separable by fractional distillation.

For optimum yields of the present hydroperoxides, it has been found that the oxidation is best effected at moderately increased temperatures, say, at temperatures of from 100° C. to 200° C., depending upon the nature of the individual alkylbiphenyl and the hydroperoxide initiator employed. Generally, very good conversion to the hydroperoxide is obtained when operating at a temperature of from 140° C. to 190° C. Vigorous agitation or stirring of the reaction mixture during the oxidation is recommended. It is also advantageous to stop the reaction before all of the alkylbiphenyl has been converted. The progress of the reaction may be experimentally determined for each initial run by analyzing, at intervals, samples of the reaction mixture for hydroperoxide content. Introduction of oxygen into the reaction mixture should be discontinued whenever such analysis shows no further increase or even a decrease in hydroperoxide content. This point varies with the nature of the alkylbiphenyl, the peroxidic catalyst and the oxygen-containing gas, as well as with the reaction conditions employed.

Peroxidic compounds, generally, may be employed as catalysts or initiators of the oxidation. As illustrative of useful peroxidic compounds may be mentioned the inorganic peroxides such as hydrogen peroxide and barium peroxide; organic peroxides such as di-tert-butyl peroxide and stearoyl peroxide; organic hydroperoxides such as tert-butyl hydroperoxide, cumene hydroperoxide, cymene hydroperoxide, tetralin hydroperoxide, etc. Convenient initiators for the reaction are the α,α-dialkyl-ar-phenylbenzyl hydroperoxides themselves, i. e., small quantities of the oxidation product may be added to the initial alkaline alkylbiphenyls and the oxygen-containing gas passed through the resulting reaction mixture. As oxygen-containing gases there may be employed oxygen or any mixture of oxygen with an inert gas, e. g. air.

The basic agent employed may be any inorganic or organic basically reacting material, e. g., a hydroxide, carbonate or bicarbonate of an alkali or alkaline earth metal such as sodium hydroxide, potassium carbonate, sodium bicarbonate, magnesium carbonate, lithium hydroxide, calcium bicarbonate; a salt of an inorganic alkaline hydroxide and an organic acid such as sodium acetate; etc.

The invention is further illustrated, but not limited, by the following examples:

Example 1

A mixture consisting of 120 g. of 4-isopropylbiphenyl, 3.0 g. of di-tert-butyl peroxide and 3.0 g. of sodium bicarbonate was charged to a small tubular reactor (12″ high, 1″ diameter), fitted with a stirrer, gas inlet condenser and the thermometer. Stirring was started and oxygen was passed through the mixture for 2 hours while it was maintained at a temperature of 148° C.–153° C.

At intervals the hydroperoxide content of the reaction mixture was determined iodometrically. At the end of 1 hour the content of α,α-dimethyl-4-phenylbenzyl hydroperoxide was 32.8 percent; at the end of two hours it was 34.6 percent.

The entire reaction mixture, without isolation of the hydroperoxide, was employed for conversion of the hydroperoxide contained therein to 4-phenylphenol by the process described in the Prill and Heimsch copending application referred to above.

Example 2

In another experiment, a mixture consisting of 120 g. of a mixture of 3- and 4-isopropylbiphenyls obtained by Friedel-Crafts reaction of biphenyl with propylene, 3.0 g. of sodium bicarbonate and 3.0 g. of di-tert-butyl peroxide was charged to the reactor described in Example 1. The mixture was heated to 150° C., but 5 minutes after oxygen flow was started the temperature rose to 180° C. After another 5 minutes it was brought to 150° C. and maintained at from 145° C. to 152° C. during the remainder of a 4-hour period. At the end of the first 2 hours, the content of α,α-dimethyl 3- and 4-phenylbenzyl hydroperoxides in the reaction mixture was 23.4 percent. At the end of the 4-hour period it was 29.8 percent. It was identified by conversion to the phenylphenols, as in Example 1.

Example 3

This example shows the effect of decreased reaction temperature on conversion of isopropylbiphenyl to the corresponding hydroperoxide.

Employing the equipment and the reactants of Example 2 in the quantities used therein, the reaction mixture was brought to a temperature of 120° C. and oxygen flow started. The temperature during a 6.5-hour period was maintained at from 118° C. to 122° C. At the end of 1 hour, the content of hydroperoxides was only 0.89 percent. At the end of 4.5 hours of oxygen flow it was only 1.6 percent, and at the end of a 6.5 hour period, it had risen to only 1.74 percent.

Example 4

This example shows conversion of 3-isopropylbiphenyl to α,α-dimethyl-3-phenylbenzyl hydroperoxide.

A mixture consisting of 120 g. of 3-isopropylbiphenyl, 3.0 g. of sodium bicarbonate and 3.0 g. of di-tert-butyl peroxide was charged to the reactor described in Example 1. Oxygen flow was started at ordinary temperatures (25° C.) and the temperature of the reaction mixture then raised to 155° C. within 50 minutes. During the next 2 hours the temperature of the reaction mixture was maintained at from 155° C. to 160° C. At the end of one hour oxygen flow at the increased temperature, the content of α,α-dimethyl-3-phenylbenzyl hydroperoxide was 8.65 percent. At the end of the 2-hour heating period it was 14.35 percent. The hydroperoxide contained in the resulting reaction mixture was converted into 3-phenylphenol by the process of the copending application referred to above.

While the above examples show only batchwise conversion of the isopropylbiphenyls to the hydroperoxides, the oxidation may also be effected by a continuous process, the oxidation mixture being continuously removed from the reaction as fresh alkaline isopropylbiphenyl and oxygen or air are led into the reaction zone. When operating in this manner it is preferred to maintain the hydroperoxide concentration of the reaction mixture at from, say, 25 percent to 40 percent.

Instead of employing di-tert-butyl peroxide as catalyst, other inorganic or organic peroxides or hydroperoxides, e. g., hydrogen peroxide, tert-butyl hydroperoxide or cumene hydroperoxide may be used. Also, instead of the isopropylbiphenyls, other nuclearly alkylated, biphenyls having a tertiary carbon atom may be similarly converted into the corresponding α,α-dialkyl-ar-phenylbenzyl hydroperoxides.

While the present hydroperoxides are very valuble for the production of phenylphenols, they are also valuable in the production of alkenylbiphenyls by primary conversion upon treatment with alkali to the α,α-dialkyl-ar-phenylbenzyl alcohols and dehydration of the later. They are also advantageously employed for a variety of other industrial purposes, e. g., as polymerizing catalysts, antioxidants, free radical liberating agents, fungicides, etc.

What I claim is:

1. The method of preparing an α,α-dimethyl-ar-phenylbenzyl hydroperoxide which comprises passing oxygen into a mixture consisting of an isopropylbiphenyl, a peroxide compound, and sodium bicarbonate at a temperature of from 140° C. to 190° C.

2. The process of preparing α,α-dimethyl-4-phenylbenzyl hydroperoxide which comprises passing oxygen into a mixture consisting of 4-isopropyl-biphenyl, a peroxide compound, and sodium bicarbonate at a temperature of 140° C. to 190° C.

3. The process of preparing α,α-dimethyl-3-phenylbenzyl hydroperoxide which comprises passing oxygen into a mixture consisting of 3-iso-propylbiphenyl, a peroxide compound, and sodium bicarbonate at a temperature of 140° C. to 190° C.

References Cited in the file of this patent

UNITED STATES PATENTS

| | | |
|---|---|---|
| 2,548,435 | Lorand et al. | Apr. 10, 1951 |

FOREIGN PATENTS

| | | |
|---|---|---|
| 497,509 | Belgium | Aug. 31, 1950 |

(Corresponding U. S. Patent No. 2,626,281, published January 20, 1953)